Figure 1:
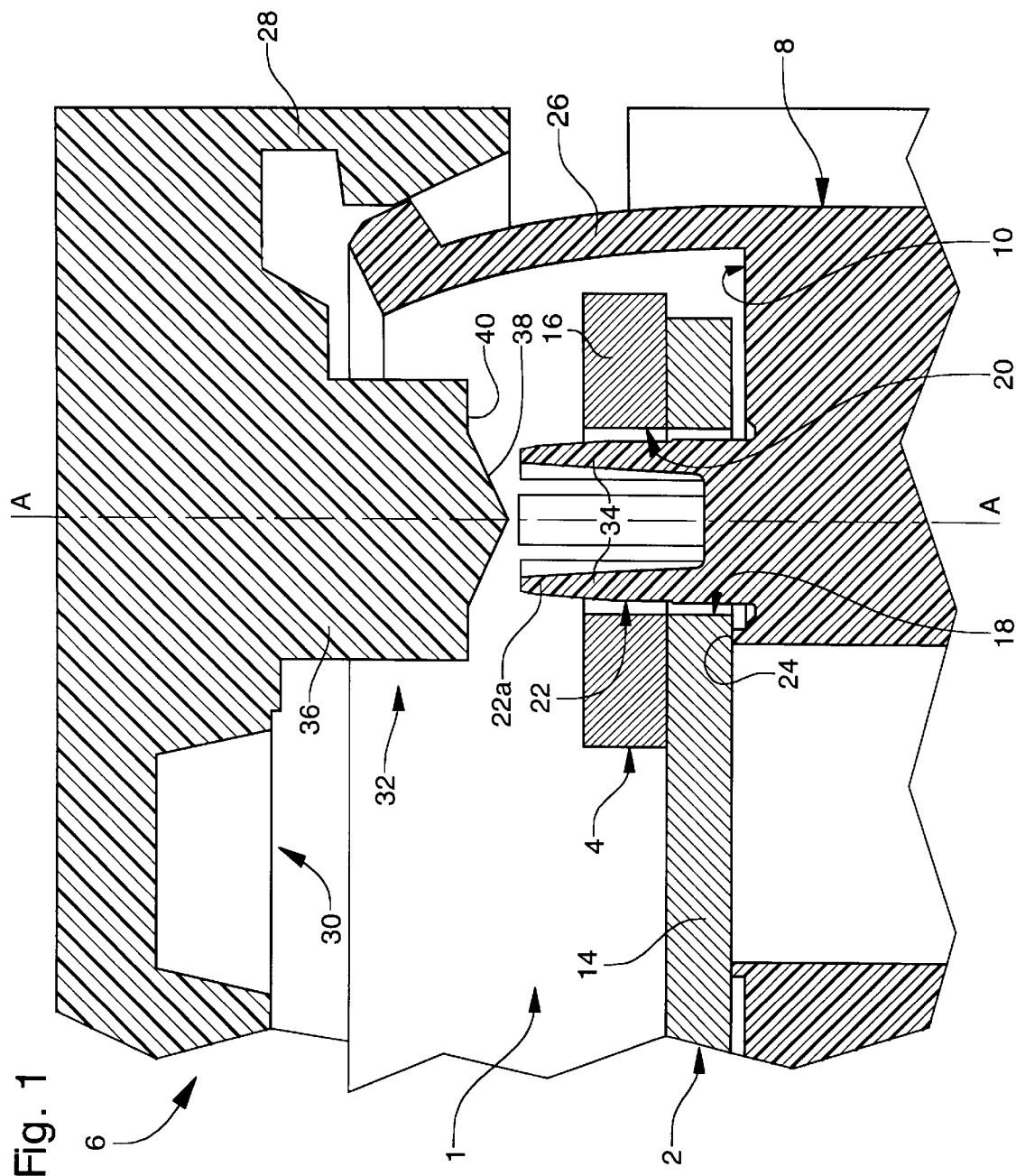

United States Patent
Strahm et al.

[11] Patent Number: 6,069,427
[45] Date of Patent: May 30, 2000

[54] DEVICE FOR SECURING A PART ONTO A BOTTOM OF A CASE

[75] Inventors: Martin Strahm, Boudry; Norbert Gasser, Bettlach; Markus Straumann, Eriswil; Jean-Christophe Rothen, Biel, all of Switzerland

[73] Assignee: Eta Sa Fabriques D'ebauches, Grenchen, Switzerland

[21] Appl. No.: 09/164,573

[22] Filed: Oct. 1, 1998

[30] Foreign Application Priority Data

Oct. 1, 1997 [CH] Switzerland ............... 2301/97

[51] Int. Cl.⁷ ...................... H02K 5/00; H02K 1/06
[52] U.S. Cl. .............................. 310/89; 310/217
[58] Field of Search ................... 310/83, 89, 91, 310/217; 403/167, 193, 215, 242, 290, 291, 289, 248, 249, 250, 281, 282, 297, 313, 408.1, 406.1, 407.1

[56] References Cited

U.S. PATENT DOCUMENTS

| | | | |
|---|---|---|---|
| 3,695,654 | 10/1972 | Meyer | 403/406.1 |
| 4,921,371 | 5/1990 | Boiraeu et al. | 403/408.1 |
| 5,226,769 | 7/1993 | Negre et al. | 411/354 |
| 5,252,014 | 10/1993 | Andrews | 411/43 |
| 5,628,581 | 5/1997 | Hintz et al. | 403/408.1 |
| 5,629,823 | 5/1997 | Mizuta | 360/133 |

FOREIGN PATENT DOCUMENTS

| | | |
|---|---|---|
| 2312056 | 12/1976 | France . |
| 257544 | 3/1927 | Italy . |

*Primary Examiner*—Clayton LaBalle
*Attorney, Agent, or Firm*—Sughrue, Mion, Zinn, Macpeak & Seas, PLLC

[57] ABSTRACT

The invention concerns a device for securing at least one part onto the bottom of a case including at least one stud which projects from said bottom, said part having at least one substantially flat portion provided with an orifice having an axis substantially perpendicular to said bottom and into which said stud is introduced. The case further includes a cover provided, on the face thereof which is directed towards the bottom of said case, complementary means to said stud for, in a closed position of the cover, applying and holding said flat portion onto a support surface provided in the region of said bottom, and means for blocking the cover onto said case. Said complementary means are shaped for generating deformation of said distal portion outwards so that said deformed distal portion of said stud is inserted between said flat portion and said complementary means.

9 Claims, 2 Drawing Sheets

DEVICE FOR SECURING A PART ONTO A BOTTOM OF A CASE

The present invention concerns a device for securing apart onto a bottom of a case, in particular such a device allowing a part to be secured onto the bottom of a case including a cover.

Devices for securing at least one part, such as a stepping motor stator, onto the bottom of a case, are already known. According to this prior art, the case includes at least one stud made of plastic material, which projects from the bottom and the part to be fixed has at least one substantially flat portion provided with an orifice having an axis substantially perpendicular to the bottom and into which the stud is introduced. In these devices, the securing of the part in the bottom of the case is achieved via an ultrasound bonding machine using a sonotrode. The sonotrode comes into contact with the head of the stud which projects from the orifice and transmits energy to the head of the stud in order to melt the material of said head to achieve bonding or a type of riveting.

This method has, however, numerous drawbacks. The implementation of this method requires the use of complex and expensive bonding machines. Moreover, the quality of the bonding is difficult to control with such a method in that, after some time of use, microcracks frequently appear in the sonotrode, these microcracks having a detrimental effect on the quality of the bonding. These microcracks lead to non uniform distribution of the energy transmitted by the sonotrode which generally leads to incomplete melting of the stud or a geometrical fault in the melted stud head and consequently defective bonding or even bonding which does not fix the part onto the stud in a reliable manner. This is added to the fact that these microcracks cannot be detected by the naked eye, so that it is difficult to foresee and monitor in advance the quality of the bonding which will be obtained. This bonding method is also very dependent on the material of which the stud is made and consequently requires long and expensive implementation upon each change of material.

An object of the invention is thus to overcome the drawbacks of the aforementioned prior art by providing a device for securing a part onto a bottom of a case such as an electric micromotor case, which is reliable, simple, economical and in particular which does not require any delicate bonding operation.

The invention therefore concerns a device for securing at least one part onto the bottom of a case including at least one stud which projects from said bottom, said part having at least one substantially flat portion provided with an orifice having an axis substantially perpendicular to said bottom and into which said stud is introduced, characterised in that said stud includes a distal portion able to be deformed, and in that the case further includes a cover provided, on the face thereof which is directed towards the bottom of the case, complementary means to said stud for, in a closed position of the cover, applying and holding said flat portion onto a support surface provided in the region of said bottom, and means for blocking the cover onto said case, and in that said complementary means are shaped for generating deformation of said distal portion outwards so that said deformed distal portion of said stud is inserted between said flat portion and said complementary means.

As a result of these features, the simple operating of closing and blocking the cover on the case, for example by snap fitting, allows deformation of the distal portion of the stud and secure fixing of the part to the bottom of the case, this operation being achieved without the use of a bonding machine.

According to an advantageous embodiment, the distal portion is formed of a plurality of leaves arranged in corolle. This allows said portion of the stud to be deformed by folding with slight force, which facilitates fixation when the cover is closed. Furthermore, the deformation of the leaves by folding generates a resilient return force in an axial direction, i.e. parallel to the geometrical axis of the stud, on the prominent portion, which allows, if necessary, compensation for a play which could appear between the prominent portion, the flat portion and the part to be secured, and the support surface of the case, for example following heat expansion.

Figure 2:
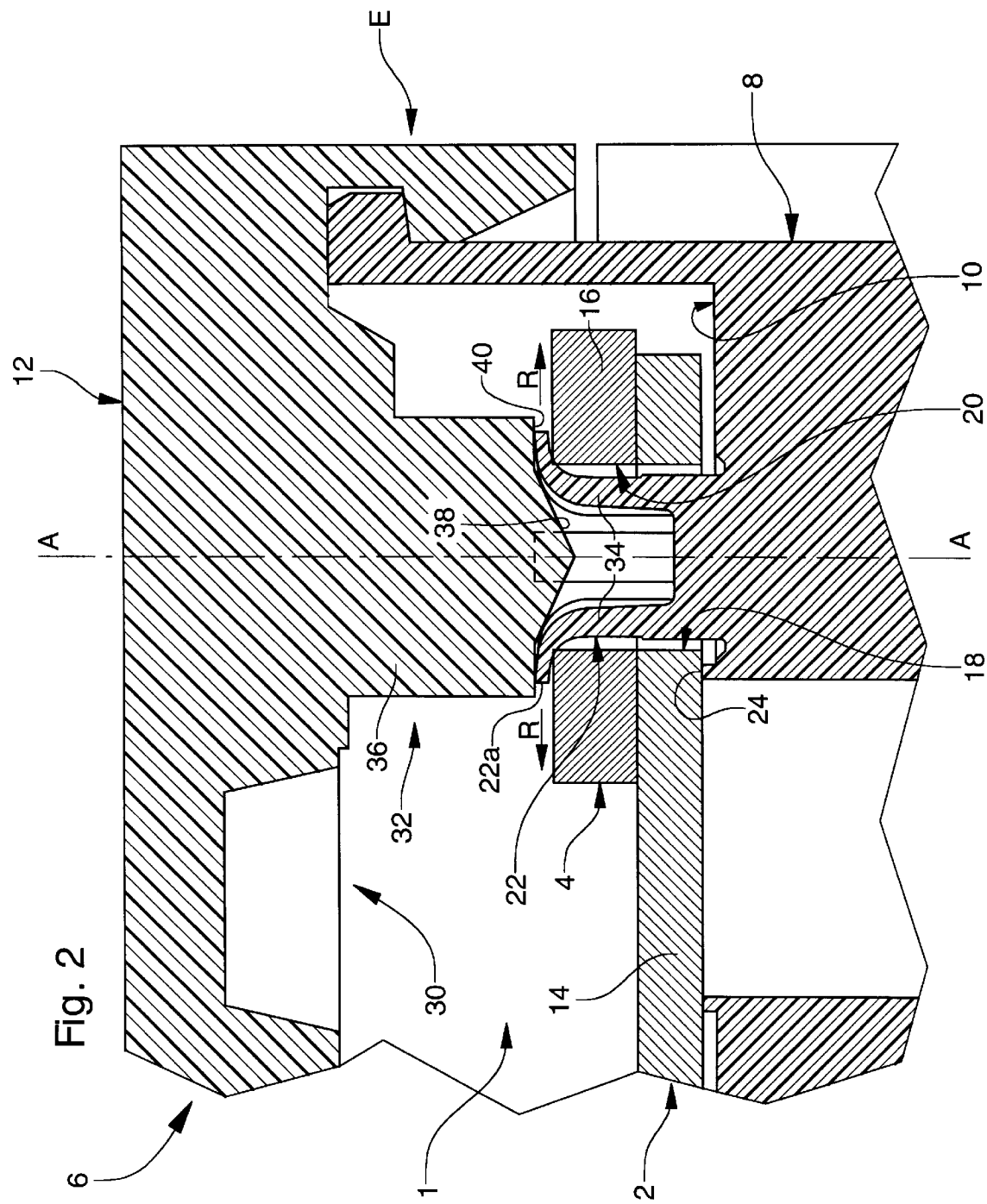

Other features and advantages of the invention will appear more clearly upon reading the following description of an embodiment of the invention given solely by way of illustrative and non limiting example, this description being made in conjunction with the drawings, in which:

FIGS. 1 and 2 are schematic cross-sectional views of a device for securing a part in the bottom of a case, respectively prior to and after fixation of said part.

The description of the invention will be made within the scope of an application to the fixation of a micromotor stator and coil on the bottom of a case closed by a cover, however it goes without saying that the invention is in no way limited to this application and could advantageously be used within the scope of any other application in which a part needs to be secured on the bottom of a case, in particular a case closed by a cover.

FIG. 1 shows, designated by the general reference 1, an embodiment of the device for securing at least one part on the bottom of a case according to the invention, device 1 being shown prior to fixation of the part or parts in question. In the embodiment example shown, device 1 allows fixation of two parts 2, 4 respectively a stator and a coil of an electric micromotor encased in a case 6 including a base plate 8, defining a bottom 10, and a cover 12. Stator 2, coil 4 and case 6 are partially shown in cross-section in FIG. 1. Stator 2 and coil 4 each include a substantially flat portion 14, 16 provided with a respective orifice 18, 20 having an axis A—A which is substantially perpendicular to bottom 10.

Bottom 10 includes a stud 22 which projects perpendicularly from the latter. This bottom 10 further includes a support surface 24 situated substantially in proximity to stud 22.

In the example shown, orifices 18, 20 are placed on stud 22 so that flat portion 14 of stator 2 rests directly on said surface 24 while flat portion 16 of coil 4 rests on surface 24 via flat portion 14.

Bottom 10 and cover 12 are each extended by respective lateral walls 26, 28 which can be engaged and blocked onto each other in a closed position of case 6 (FIG. 2). The blocking of cover 12 onto bottom 10 is advantageously achieved by a conventional snap fitting device E.

According to the invention, stud 22 includes a distal portion 22a which is able to be deformed and cover 12 includes, on the face 30 thereof directed towards bottom 10 of case 8, complementary means 32 to stud 22 for generating, in the closed position of case 8, deformation of distal portion 22a in a radial direction—symbolised by an arrow R in the Figure—outwards from the centre of stud 22, so that a portion of the material of said distal portion is inserted between the element or elements to be fixed into the bottom of the case, in particular between flat portion 16 of the coil, and complementary means 32. This results in secure application and holding of flat portion 16 against support surface 24, in this case via flat portion 14 of stator 2.

In the embodiment shown, deformable distal portion 22a is hollowed out at its centre and includes at its periphery a plurality of thin sheets or leaves 34 arranged in corolle. It will be noted that in the example shown, thin sheets 34 are spaced at regular intervals from each other. Advantageously, the number of thin sheets is comprised between 2 and 6 and is preferably 4. The thin sheets are advantageously able to be deformed elastically so that they can exert an axial return force in the direction of the cover and thus hold the stator and the coil against support surface 24 with almost no play at all.

Complementary means 32 include a rigid support element 36 which projects from face 30 of the cover and which is arranged substantially facing stud 22 with which it is associated. Support element 36 has an end face which includes in its portion facing stud 22, more particularly facing thin sheets 34, a truncated portion 38 which facilitates the spacing of thin sheets 34 in radial direction R during closing of case 8 by cover 18.

It goes without saying that truncated portion 38 can, according to an alternative embodiment, be replaced by a V shaped portion, for example when distal portion 22a includes only two diametrically opposite thin sheets 34. Those skilled in the art will select the most appropriate shape as a function of the geometrical arrangement of thin sheets 34, it being understood that this shape will facilitate deformation in radial direction R, outwards, of thin sheets 34.

It will also be noted in this regard that truncated shaped portion 38, or as appropriate the V shaped portion, extends radially outwards by a substantially flat annular surface 40 parallel to flat portion 16 of coil 4.

Case 8 and cover 12 can be made of a synthetic material such as, for example, Crastin® or if appropriate a metallic material such as Durimphy®. In both cases, these elements will preferably be obtained directly by moulding, stud 22 and support surface 2 being made integral with the bottom and support element 36 being made integral with the cover.

The materials which have just been mentioned hereinbefore can of course be replaced by other materials offering in particular sufficient deformation and elastic properties to form deformable distal portion 22a.

It goes without saying that the number of studs 22a and complementary means 32 is not limited and could vary in particular as a function of the shape and the nature of the elements to be fixed.

What is claimed is:

1. A device for securing at least one part onto the bottom of a case including at least one stud which projects from said bottom, said part having at least one substantially flat portion provided with an orifice having an axis substantially perpendicular to said bottom and into which said stud is introduced, said stud includes a distal portion able to be deformed, and wherein the case further includes a cover provided, on the face thereof which is directed towards the bottom of said case, complementary means to said stud for, in a closed position of the cover, applying and holding said flat portion onto a support surface provided in the region of said bottom, and means for blocking the cover onto said case, and wherein said complementary means are shaped for generating deformation of said distal portion outwards so that said deformed distal portion of said stud is inserted between said flat portion and said complementary means.

2. A securing device according to claim 1, wherein said distal portion is formed of a plurality of thin sheets arranged in corolle.

3. A securing device according to claim 1, wherein said complementary means include for each stud a support element projecting from said face of the cover, said support element being arranged facing the stud with which it is associated.

4. A securing device according to claim 3, wherein said distal portion is formed of a plurality of thin sheets arranged in corolle, and wherein said support element includes on its end face facing said stud, a truncated or V shaped portion for causing the spacing outwards of said thin sheets.

5. A securing device according to claim 4, wherein said truncated or V shaped portion extends radially outwards by a substantially flat surface parallel to said flat portion of said part.

6. A securing device according to claim 2, wherein said thin sheets are able to be deformed elastically.

7. A securing device according to claim 2, wherein said thin sheets are separated from each other.

8. A securing device according to claim 1, wherein said stud is made of a synthetic material.

9. A use of the securing device according to claim 1, for securing a stack comprising the stator and the coil of an electric motor.

* * * * *